May 8, 1973
H. LAPIDOT
PROCESS AND APPARATUS FOR THE OZONE TREATMENT OF A LIQUID MATERIAL
Filed Nov. 3, 1971
3,732,163
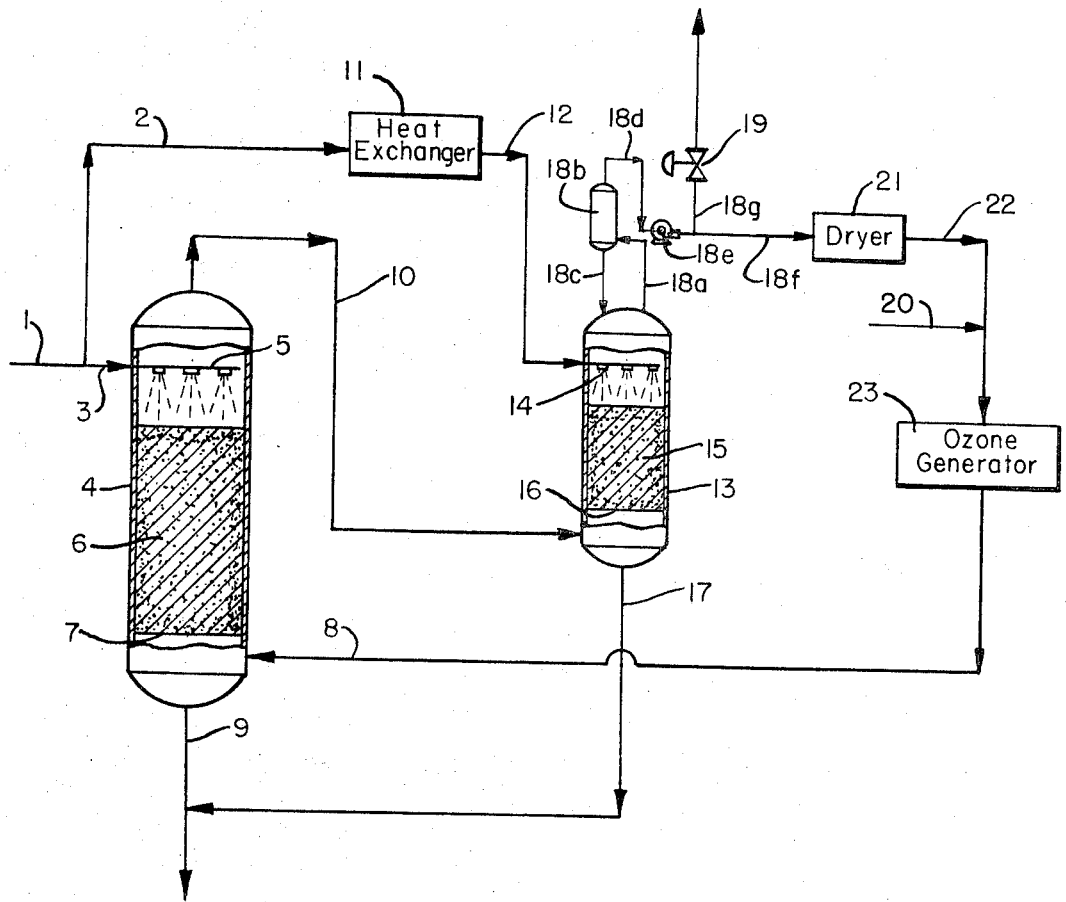

United States Patent Office 3,732,163
Patented May 8, 1973

3,732,163
PROCESS AND APPARATUS FOR THE OZONE
TREATMENT OF A LIQUID MATERIAL
Heine Lapidot, Latham, N.Y., assignor to
General Electric Company
Filed Nov. 3, 1971, Ser. No. 195,390
Int. Cl. C02c 5/04
U.S. Cl. 210—47
17 Claims

ABSTRACT OF THE DISCLOSURE

A process for the ozone treatment of a liquid material which includes introducing a major portion of the liquid into a first ozonation zone; introducing the remainder of the liquid into a second ozonation zone; introducing an ozone-containing gas into the first ozonation zone; removing a gaseous stream from the first ozonation zone and conducting it to the second ozonation zone; removing a gaseous stream from the second ozonation zone and conducting it to an ozone-generating zone wherein the ozone-containing gas is produced; the second ozonation zone is smaller in size than the first ozonation zone but provides more efficient liquid-gas contact than does the first ozonation zone; and the apparatus useful for carrying out the process.

BACKGROUND OF THE INVENTION

The present invention is concerned with a process for the ozone treatment of a liquid material, and the apparatus suitable for such process. More particularly, the present invention is concerned with a process employing plural ozone treatment zones, and the apparatus therefor.

One of the most serious problems facing industry now a days is the treatment of industrial waste streams to convert materials therein which adversely affect the ecology into harmless compounds in order to safely dispose of such waste streams. In particular, it is important to purify aqueous waste streams so that the water can either be returned to the natural source from where it came or can be recycled and used in place of fresh water.

It has previously been suggested to treat certain industrial waste water streams with ozone under certain conditions. Ozone treatments however have been too expensive and too inefficient for the treatment of the large quantities of waste water which are usually present in normal commercial operations. Accordingly, ozone treatment of waste water has not been generally accepted by the industrial community and has not been used to any appreciable extent in large scale commercial operations. Ozone treatments suggested heretofore require relatively large pieces of equipment as compared to the amount of material being treated. Also such treatments are very expensive due to poor ozone utilization particularly since ozone is costly.

The present invention, however, provides a treatment employing ozone and the apparatus therefor which eliminates or at least greatly minimizes the problems previously associated with ozone treatments. The present invention provides for a practical, efficient, and effective process and apparatus therefor, which employs ozone treatment. The present invention makes it possible to install an efficient commercial ozone treatment setup at greatly reduced costs. Accordingly, the present invention makes it practical to use ozone to treat the large quantities of waste streams produced in industrial plants.

BRIEF DESCRIPTION OF INVENTION

The process aspect of the present invention is concerned with the ozone treatment of a liquid material which comprises:

(A) providing a liquid material which is to be subjected to ozonation;
(B) introducing a major portion of said liquid into the upper portion of a first ozonation zone;
(C) introducing the remaining portion of said liquid into the upper portion of a second ozonation zone;
(D) introducing ozone-containing gas into the lower portion of said first ozonation zone;
(E) removing an ozone-treated product from the lower portion of said first ozonation zone;
(F) removing a gaseous stream from the upper portion of said first ozonation zone;
(G) conducting said gaseous stream removed from the upper portion of said first ozonation zone to the bottom portion of said second ozonation zone;
(H) removing an ozone-treated product from the lower portion of said second ozonation zone;
(I) removing a gaseous stream from the upper portion of said second ozonation zone;
(J) conducting the gaseous stream removed from the upper portion of said second ozonation zone to an ozone-generating zone;
(K) removing ozone-containing gas from the ozone-generating zone and conducting it to the lower portion of said first ozonation zone;
(L) said second ozonation zone being smaller in size than said first ozonation zone, but providing more efficient per unit volume contact between the liquid material and the gas flowing therethrough than the per unit volume contact provided by said first ozonation zone.

The apparatus aspect of the present invention comprises:

(A) a first packed tower containing a first inlet in its upper portion for the introduction of liquid; a second inlet in its lower portion for the introduction of gas; an outlet in its lower portion for the removal of a liquid and a means in its upper portion for the removal of a gaseous stream;
(B) a second packed tower containing an inlet in its upper portion for the introduction of liquid; a first means in its lower portion for the introduction of a gaseous stream, a second means in its lower portion for the removal of a liquid and an outlet in its upper portion for the removal of a gaseous stream;
(C) said second packed tower being smaller than said first packed tower but containing more efficient packing than that in said first packed tower;
(D) an ozone-generating means which contains an inlet for receiving a gaseous stream, and an outlet for removing ozone-containing gas; and
(E) wherein said means of said first packed tower is connected to said first means of said second packed tower; said outlet of said ozone-generating means is connected to the second inlet of said first packed tower; and said outlet of said second packed tower is connected to the inlet of said ozone-generating means.

The figure illustrates a preferred ozone treatment set up according to the present invention.

DESCRIPTION OF PREFERRED EMBODIMENTS

The liquid material which can be subjected to the ozonation process of the present invention can be any liquid which is or contains constituents susceptible to treatment with ozone. Of particular importance are industrial waste water streams and particularly those streams which contain organic contamination. Specifically the liquid can be the aqueous waste stream from an industrial silicone polymer producing plant. Such an aqueous waste stream from a silicone polymer plant typically contains water-soluble organic contaminants such as methanol, acetone, butanol, and isopropanol; toluene; benzene; xylene and the like and a Chemical Oxygen Demand (C.O.D.) of 30–1500 p.p.m. When the liquid material treated according to the present invention is a waste water stream from a silicone polymer plant, it is preferred that such stream has a pH of at least about 12 and it is most preferred that it has a pH of between about 12 and about 12.3.

A major portion of the liquid to be treated but less than the entire portion is introduced into the upper portion of a first ozonation zone. Usually from about 70 to about 95% by weight of the liquid material is introduced into the first ozonation zone, and preferably from about 80 to 90% by weight of the material is introduced into the first ozonation zone. The temperature of the liquid entering the first ozonation zone is generally the temperature of the liquid as received from the previous plant operations, and is usually between about 0° C. and and 60° C., and preferably between about 0° C. and about 35° C.

The first ozonation zone is a packed tower which, of course, must be big enough to handle the quantity of liquid material which is to flow therethrough. For instance, when the amount of liquid material entering the first ozonation zone is from the about 1000 to about 3000 gallons per minute (g.p.m.) which is a typical range for a commercial silicone polymer plant, the tower should have a diameter of about 6–8 feet and a height of about 40 feet. The tower can be constructed of any construction material which is resistant to oxidation and ozonation such as carbon-steel lined with a suitable material such as Teflon, polyvinylchloride or polypropylene.

The tower can be packed with any of the known packing materials employed in such towers. Some conventional packing shapes include Raschig rings, Berl saddles, Pall rings and Intalox saddles manufactured by Norton Co. The packing can be constructed of any convenient material such as porcelain, clay, carbon, and suitable plastics. The packing material employed in the first ozonation zone has a size from about ½ inch to about 2 inches. Of particular interest are Intalox saddles. It is preferred that the packing in the column be random rather than stacked. In addition, the first ozonation zone may contain liquid redistributors to redirect the downward flow of the liquid material towards the center of the packing to prevent what is commonly referred to as channeling.

That portion of the liquid material to be subjected to the ozonation of the present invention which has not been introduced into the first ozonation zone is introduced into the upper portion of a second ozonation zone. The temperature of the portion of the liquid stream which is introduced into the second ozonation zone is between about 0° C. and about 60° C., and preferably is between about 0° C. and about 5° C. The most preferred temperature is between about 0.5 and 5° C. The temperature of the stream is at least about 0° C. and preferably at least about 0.5° C. since it must be high enough to avoid the formation of any appreciable amounts of ice in the liquid stream which would seriously retard the flow of liquid through the tower. When the temperature of the stream is no higher than about 5° C., the amount of water vapor present in the gaseous stream to be taken off as overhead from the second ozonation zone will be very small so as to provide processing advantageous downstream as will be discussed hereinafter.

The temperature of the liquid stream as received from the previous plant operations may be between about 0° C. and about 5° C.; and therefore, when practicing the preferred aspect of the present invention, the requisite amount can be conducted to the second ozonation zone without first being subjected to a heat exchange step. However, if the temperature of that portion of the liquid which is to be conducted to the second ozonation zone is higher than about 5° C., it will be preferable to conduct it to a cooling zone prior to introducing it into the second ozonation zone to reduce the temperature to about 5° C. or less in order to achieve certain processing advantages as will be discussed hereinbelow.

The cooling zone can be any known heat exchanger suitable for handling the desired quantity of material. It may be advantageous to conduct the cooling in an evaporative type heat exchanger under vacuum such as at about 5 mm. Hg of absolute pressure in which the cooling is produced by evaporation of a portion of the liquid and at the same time to remove gases such as oxygen and nitrogen therefrom, so that the liquid stream will have an increased capacity for absorbing such gases from the gaseous stream in the second ozonation zone. The absorption of nitrogen, in turn, may be advantageous with regard to subsequent processing of the gaseous stream as will be discussed hereinbelow.

Usually between about 5 and 30%, and preferably between about 10 and 20% of the liquid material which is to be subjected to ozonation is introduced into the second ozonation zone. The second ozonation zone is also a packed tower; however, it is smaller in size than the first packed tower. For instance, when the amount of liquid material entering the second ozonation zone is from about 100 to about 600 g.p.m., which is a typical range for a commercial silicone polymer plant, the tower should have a diameter of about 2 to 3 feet and a height of about 16 to 25 feet.

The second tower can be constructed of any suitable construction material which is resistant to oxidation and ozonation such as carbon-steel lined with polyvinyl chloride, polypropylene, or Teflon. In addition, the second ozonation zone may contain liquid redistributors to redirect the downward flow of the liquid material towards the center of the packing to prevent what is commonly referred to as channeling.

The second column does not have to be physically separated from the first column as illustrated in the drawing, but the second column may be physically located on top of the first column such that there is one physical column with the top being the second zone and the bottom being the first zone.

In addition, the second packed tower contains packing which is more efficient with respect to per unit volume contact than is the packing in the first packed tower. The more efficient packing can be achieved by employing the same or different type of packing shape as used in the first tower except employing a smaller size and/or by employing another type of packing shape which is more efficient due to its shape and packing characteristics. Accordingly, the packing employed in the second tower is more expensive than the packing used in the first packed column.

Since the second packed tower is relatively small compared to the first packed tower, the use of more expensive packing does not appreciably increase the cost of the overall process. The packing in the second tower is usually between ½ inch and 1 inch. Of particular interest are Intalox saddles.

Since the relative amount of ozone which will be present in the gas entering the second ozonation zone is quite small, the second tower is provided with this relatively expensive packing in order to insure adequate contact between the downwardly flowing liquid and upwardly flowing gas to effect the desired ozonation.

It is, of course, understood that the first and/or second ozonation zones could contain a plurality of towers in parallel in place of a single tower.

The ozone-containing gas which is introduced into the lower portion of the first ozonation zone contains from about 2 to about 8% by weight of ozone, from about 80 to about 98% by weight of oxygen, and up to about 15% by weight of nitrogen, and possibly small quantities of other gases which are normally present in air such as carbon dioxide, argon, and the like. However, the above are the preferable concentrations and the amount of oxygen and nitrogen may be at any concentration such that concentration of nitrogen may be as high as that found in air. For best results, it has been found that the amount of ozone-containing gas incorporated into the first ozonation zone should be selected so as to provide about 3.4 pounds of ozone per pound of C.O.D. of contaminants to be treated in the entire process. The ozone-containing gas flows countercurrent to the flow of the liquid material in the ozonation zone.

A typical ozone-treated product which is removed from the first ozonation zone at the lower portion of the zone is a decontaminated material having a C.O.D. of about 5-45 p.p.m. The product can be returned to the natural source from where the liquid was obtained or can be recycled for use in the plant in place of fresh water. If desired, the ozone-treated product can be further treated such as adjusting the pH of the product to between about 6 and 9.

The gaseous stream which is removed from the upper portion of the first ozonation zone, and conducted to the lower portion of the second ozonation zone contains up to about 10% by weight of ozone conducted to the first ozonation zone. Although the amount of ozone present in the gaseous stream in the second ozonation zone is small, it is sufficient to provide a significant reduction in the organic materials present in the liquid stream flowing downward in the second ozonation zone and is of sufficient amount to treat the liquid material in this zone since the quantity of liquid material added to the second ozonation zone is relatively small compared to the quantity employed in the first ozonation zone.

For the best utilization of ozone, it is preferred that the percent of liquid treated in the second ozonation zone based upon the total liquid being treated closely correspond to the relative percent of ozone which is present in the gaseous stream entering the second ozonation zone based upon the total amount of ozone initially present in the ozone-containing gas.

Although the amount of ozone present in the gaseous stream entering the second ozonation zone is small when based upon the total amount of gas flowing through the second ozonation zone, this amount is appreciable when compared to the total amount of ozone introduced into the system via the first ozonation zone. Accordingly, the utilization of the ozone in the second ozonation zone represents a significant increase in the efficiency of the present process. Since the cost of producing ozone is quite high, the increased utilization accomplished by this second and smaller ozonation packed tower results in quite a significant decrease in the overall cost of the process along with a substantial increase in the efficiency of the process.

A typical ozone-treated product removed from the second ozonation zone has a C.O.D. which is comparable to that of the product removed from the first ozonation zone. Since the second ozonation tower is more efficient than the first ozonation tower, and since much less liquid material flows therethrough, it is possible to obtain comparable treatments in the two columns. The product removed from the second ozonation zone can be returned to the natural source from where the liquid was obtained such as a river or can be recycled for use in the plant in place of fresh liquid. In addition, the product from the second ozonation zone can be mixed with the product from the first ozonation zone and then disposed of accordingly or recycled for reuse in the plant or further treated such as adjusting pH to about 6 to 9. Although not necessary to the present process, the outlet stream from the second zone can be directed to the first zone to insure that this portion of the water gets the full ozone treatment at all times.

A gaseous stream is removed from the upper portion of the second ozonation zone, which contains at most about 0.01% by weight of ozone and a concentration of water vapor which is not a fixed quantity but varies with the temperature of the water. As previously discussed, when the temperature of the liquid stream introduced into the second ozonation zone is within the preferred range of about 0 to about 5° C., the quantity of water vapor taken off by the gaseous stream is held to a minimum, and is at most about 1.0% by weight.

The gaseous stream removed from the upper portion of the second ozonation zone is then utilized for the preparation of the ozone-containing gas which is introduced into the first ozonation zone. Accordingly, the gaseous stream removed from the upper portion of the second ozonation zone is subjected to ozone regeneration in a suitable ozone generating zone.

The gaseous stream is mixed with oxygen containing gas such as pure oxygen in an amount to replenish the amount of oxygen and ozone which was used up in the two ozonation zones, preferably after the gaseous stream has passed through the dryer although the oxygen containing gas can be added in some cases before the drying step. Before being conducted to an ozone generator, it is usually necessary to dry the gases in order to obtain a suitable gas for generating ozone such as one having a dew point of from about $-40$ to about $-60°$ F. A suitable type of dryer is one which employs a desiccant such as silica gel, molecular sieves, and alumina. Since the removal of water vapor from such a gas is not very efficient, it is advantageous that the water vapor content of a gas entering the dryer be as small as possible since minor increases in the amount of water vapor result in disproportionate increases in the size of the dryer. Accordingly, by restricting the temperature of the liquid entering the second ozonation column to the preferred maximum of about 5° C., quite a significant reduction in the size and corresponding expense of the gas dryer is attained.

In addition, the nitrogen content of the gas entering the ozone generator should be as low as possible. As mentioned above the amount of nitrogen gas present is reduced due to the contact in the second packed tower by being absorbed by the downwardly flowing liquid of the second packed tower if this portion of the liquid has been cooled and degasified by evaporation cooling, as described above. If the gaseous stream leaving the second packed tower has too high a nitrogen content for the ozone generating step, then a suitable gas bleed can be provided after the second packed tower and prior to the oxygen addition.

The dried gaseous stream is then conducted to an ozone-generating device. Any of the available ozone-generating devices can be employed. Of particular interest are those generators available under the trade designation "Advanced Corona Generator" from Purification Sciences, Inc., 75 East North Street, New York, N.Y. 14456. One such generator is described in German Offen. 2026622 application June 4, 1969, issued Dec. 10, 1970, and entitled "Corona Discharge Apparatus for Generating Ozone Under Pressure." This type of ozone-generating apparatus is preferred since according to the manufacturer, it can produce higher percentages of ozone in higher quantities than obtained from the more conventional ozone generators. However, other commercially available ozone generators such as ones of the concentric tube type or the plate type can be utilized. For example, such generators are manufactured by the Welsbach Corporation, and a detailed discussion of these types of generators can be found in the McGraw-Hill Encyclopedia of Science and Technology, McGraw-Hill, Inc., 1966, volume 9, page 479. The ozone-containing gas obtained from the ozone generator is then introduced into the bottom portion of the first packed tower.

The present invention will be more fully understood by reading the following description in conjunction with the figure which schematically illustrates a preferred ozone treatment of a liquid material.

In the figure, line 1 splits up into line 2 and line 3, while line 3 connects to a packed tower 4. Packed tower 4 contains a liquid distributor 5, packing 6, packing support 7, a liquid outlet 9, and an overhead outlet line 10. Overhead outlet line 10 connects to packed tower 13. Line 2 connects to heat exchanger 11 which is provided with an outlet line 12 which connects to packed tower 13. Packed tower 13 is provided with a liquid distributor 14, packing 15, packing support 16, liquid outlet 17, and overhead outlet line 18a. Overhead outlet line 18a enters into deentrainer 18b. From deentrainer 18b the separated water or liquid passes back into the column through line 18c. The outlet gas passes from deentrainer 18b through line 18d into compressor 18e, which gas passes from the compressor into dryer 21 through line 18f. Liquid outlet line 17 connects to liquid outlet line 9 from the packed tower 4. 18f is connected to line 18g which has a valve 19. Dryer 21 is provided with an outlet 22 which in turn connects to ozone generator 23. Line 20 which feeds oxygen-containing gas connects to line 22 after dryer 21. Ozone generator 23 is provided with an outlet line 8 which connects to packed tower 4.

An industrial waste water stream from a silicone polymer plant is conducted through line 1 whereby a predominant portion of the stream enters the packed tower 4 via line 3 while the remainder of the waste water stream is conducted to heat exchanger 11 via line 2. The waste water is distributed to the packing of the first packed tower through the distributor 5 and flows downward through the packing in the tower. An ozone-containing gas is conducted to the first packed tower and flows upwardly through the packings in the tower. An ozone-treated product is removed from the first packed tower through line 9. The purity of the product is such that it can be directly returned to the natural source from where it was obtained or it can be recycled in place of fresh water in the silicone plant. A vapor stream is removed as the overhead from the first packed tower through line 10 and is introduced into the bottom portion of the second packed tower 13. Cooled liquid is removed from the heat exchanger 11 through line 12 and is conducted to the second packed tower and distributed into the tower by the distributor 14. The liquid stream flows downward through the tower through the packing 15 while the vapor stream from line 10 flows upwardly through the packed tower. An ozone-treated liquid product of reduced C.O.D. is removed from the packed tower through line 17 whereinafter it is combined with the product from packed column 4 at line 9. An overhead vapor stream is removed from the second packed tower through line 18a and is conducted to deentrainer 18b. Liquid is removed from the deentrainer at the bottom and returns to the second packed tower. A vapor stream is removed from the deentrainer as the overhead and enters compressor 18e. The vapor leaves the compressor through line 18f. A portion of this vapor stream is bled from the system by opening valve 19. The vapor is conducted to a dryer 21 and then oxygen is added to the vapor streams by line 20. The dried gas is removed from the dryer through line 22 and is sent to an ozone-generating device 23. The ozone-containing gas is removed from the ozone-generating device through line 8 and is fed to the bottom portion of the first packed tower 4.

In order that the invention may be better understood the following non-limiting examples are given:

Example 1

1200 gallons per minute of an industrial waste water stream from a silicone polymer plant having a C.O.D. of 90 p.p.m. a temperature of 30° C., and a pH of 12 is split up into a first stream and a second stream. The size of the first stream is 1080 gallons per minute and the size of the second stream is 120 gallons per minute. The first stream is fed to a packed column having an 8 foot diameter and being 40 feet high and being packed with 2 inch ceramic Intalox saddles. 3300 pounds per hour of a gas containing 5% by weight ozone, 80% by weight oxygen, and 15% by weight nitrogen are added to the first packed tower at the lower vapor inlet of the tower. About 1080 gallons per minute of a liquid product having a C.O.D. of 10 p.p.m. are removed from the bottom of the first packed tower. A gaseous stream containing 0.5% ozone is removed from the overhead of the first packed tower and is conducted to the bottom portion of a second packed tower having a diameter of 2 feet and a height of 15 feet and being packed with ½ inch ceramic Intalox saddles. Meanwhile the second portion of the waste water stream is sent to a heat exchanger whereby it is cooled to a temperature of 2° C. The cooled waste water liquid is then conducted to the upper portion of the second packed tower. About 120 gallons per minute of a liquid product having a C.O.D. of 15 p.p.m. are removed from the second packed tower. This stream is admixed with the product stream from the first packed tower. A gaseous stream is removed as the overhead from the second packed tower and is conducted to a deentrainer. A gaseous stream is removed as the overhead from the deentrainer. This stream contains about 16.65% by weight nitrogen, 1% by weight water vapor, and 0.01% by weight ozone with the remainder being oxygen. 56.3 pounds per hour of this stream are purged. The remainder of the stream is then conducted to a silica gel dryer and then admixed with 186.6 pounds per hour of oxygen. The gaseous stream removed from the silica gel dryer is essentially anhydrous and after adding the mentioned amount of oxygen contains about 85% of oxygen and about 15% nitrogen. The gaseous stream is then conducted to an ozone generator. 3300 pounds per hour of a gas containing 5% by weight ozone, 80% by weight oxygen, and 15% by weight nitrogen are removed from the corona discharge generator and are conducted to the first packed tower.

Example 2

The procedure of Example 1 is repeated except that the waste water stream initially has a C.O.D of 180 p.p.m., and contains about 59 p.p.m. of suspended solids, 80 p.p.m. of methanol, 55 p.p.m. of ethanol, 10 p.p.m. of acetone, 10 p.p.m. of isopropanol, and 40 p.p.m. of other unidentified inpurities. The liquid product obtained from the process has a C.O.D. of 42 p.p.m., and contains 4 p.p.m. of suspended solids, 0 p.p.m. of methanol, 0 p.p.m. of ethanol, 10 p.p.m. of acetone, 0 p.p.m. of isopropanol, and 0 p.p.m. of the other unidentified impurities.

Example 3

2000 gallons per minute of an industrial waste water stream from a silicone polymer plant and having a C.O.D. of 37 p.p.m., a temperature of 30° C., and a pH of 12 is split up into a first stream and a second stream. The size of the first stream is 1800 gallons per minute and the size of the second stream is 200 gallons per minute. The first stream is fed to a packed column having an 8 foot diameter and being 40 feet high and being packed with 2 inch ceramic Intalox saddles. 2500 pounds per hour of a gas containing 4% by weight of ozone, 81% by weight of oxygen, and 15% by weight of nitrogen are added to the first packed tower at the lower vapor inlet of the tower. About 1800 gallons per minute of a liquid product having a C.O.D. of 8 p.p.m. are removed from the bottom of the first packed tower. A gaseous stream containing 0.4% ozone is removed from the overhead of the first packed tower and is conducted to the bottom portion of a second packed tower having a diameter of 2 feet and a height of 15 feet and being packed with ½ inch ceramic Intalox saddles. Meanwhile the second portion of the waste water stream is sent to a heat exchanger whereby it is cooled to a temperature of 2° C. The cooled waste water liquid is then conducted to the upper portion of the second packed tower. About 200 gallons per minute of a liquid product having a C.O.D. of 10 p.p.m. are removed from the second packed tower. This stream is admixed with the product stream from the first packed tower. A gaseous stream is removed as the overhead from the second packed tower and is conducted to a deentrainer. A gaseous stream is removed as the overhead from the deentrainer. This stream contains about 17.5% by weight nitrogen, 1.0% by weight water vapor, and 0.01% by weight ozone with the remainder being oxygen. 99.1 pounds per hour of this stream are purged. The remainder of the stream is then conducted to a silica gel dryer and then admixed with 320 pounds of oxygen per hour. The gaseous stream removed from the silica gel dryer is essentially anhydrous, and after adding the said oxygen, it contains about 85% by weight of oxygen and 15% by weight of nitrogen. The gaseous stream is then conducted to an ozone generator. 2500 pounds per hour of a gas containing 4% by weight ozone, 81% by weight oxygen, and 15% by weight nitrogen are removed from the corona discharge generator and are conducted to the first packed tower.

What is claimed is:

1. A process for the ozone treatment of a liquid material which comprises:
 (A) providing a liquid material which is to be subjected to ozonation;
 (B) introducing a major portion of said liquid material into the upper portion of a first ozonation zone;
 (C) introducing the remaining portion of said liquid material into the upper portion of a second ozonation zone;
 (D) introducing an ozone-containing gas into the lower portion of said first ozonation zone;
 (E) removing an ozone-treated product from the lower portion of said first ozonation zone;
 (F) removing a gaseous stream from the upper portion of said first ozonation zone;
 (G) conducting said gaseous stream removed from the upper portion of said first ozonation zone to the bottom portion of said second ozonation zone;
 (H) removing a liquid product from the lower portion of said second ozonation zone;
 (I) removing a gaseous stream from the upper portion of said second ozonation zone;
 (J) conducting the gaseous stream removed from the upper portion of said second ozonation zone into an ozone-generating zone;
 (K) removing ozone-containing gas from said ozone-generating zone and conducting it into the lower portion of said first ozonation zone;
 (L) said second ozonation zone being smaller in size than said first ozonation zone but providing more efficient per unit volume contact between the liquid material and the gas flowing therethrough than the per unit volume contact provided by said first ozonation zone.

2. The process of claim 1 wherein said liquid material is an aqueous medium.

3. The process of claim 1 wherein said liquid material is the waste water from a silicone polymer producing plant.

4. The process of claim 1 wherein the temperature of the liquid material entering the first ozonation zone is between about 0 and about 60° C., and the temperature of the liquid material entering the second ozonation zone is between about 0 and about 60° C.

5. The process of claim 1 wherein the temperature of the liquid material entering the second ozonation zone is between about 0 and about 5° C.

6. The process of claim 1 wherein the ozone-containing gas contains from about 2 about 8% by weight of ozone and contains at least about 70% oxygen.

7. The process of claim 1 which further includes introducing said remaining portion of said liquid material into a cooling zone in order to cool the liquid material to a temperature of between about 0° C. and about 5° C. prior to introducing it into the upper portion of the second ozonation zone.

8. The process of claim 1 wherein said liquid material is the waste water from a silicone polymer producing plant and has a pH of at least 12.

9. The process of claim 1 wherein said first and second ozonation zones are located within one column wherein said first ozonation zone is located in the bottom portion of said column and said second ozonation zone is located in the upper portion of said column.

10. Apparatus useful for the ozone treatment of a liquid material which comprises:
 (A) a first packed tower containing a first inlet for introducing liquid into the upper portion of said tower, a second inlet for introducing gas into the lower portion of said tower, an outlet for removing a liquid from the lower portion of said tower, and a means for removing a gaseous stream from the upper portion of said tower;
 (B) a second packed tower containing an inlet in its upper portion for the introduction of a liquid material, a first means for introducing a gaseous stream in its lower portion, a second means for removing liquid material adjacent the lower portion of said tower; and an outlet for removing a gaseous stream from the upper portion of the tower;
 (C) said second packed tower being smaller than said first packed tower but containing more efficient packing with respect to per unit volume contact than said first packed tower;
 (D) an ozone-generating means which contains an inlet for receiving a gaseous stream, and an outlet for removing ozone-containing gas; and
 (E) wherein said means of said first packed tower is connected to said first means of said second packed tower; said outlet of said ozone-generating means is connected to the second inlet of said first packed tower; and said outlet of said second packed tower is connected to the inlet of said ozone-generating means.

11. The apparatus of claim 10 which further includes a means for drying the gaseous stream from the overhead of the second packed tower subsequent to its removal from the second packed tower and prior to the ozone-generating means.

12. The apparatus of claim 11 which further includes a means for introducing make-up oxygen to the gaseous stream from the overhead of the second packed tower subsequent to the drying means and prior to the ozone-generating means.

13. The apparatus of claim 10 which further includes a heat exchanger having an inlet and an outlet for the liquid material that is to be cooled, and conduit means connecting said outlet of said heat exchanger to the inlet of said second packed tower.

14. The apparatus of claim 10 wherein the first packed tower contains packing having a size of 1 inch to 2½ inches.

15. The apparatus of claim 10 wherein the second packed tower has packing of a size of ½ inch to 1 inch.

16. The apparatus of claim 10 wherein the packing in said first and said second packed towers is Intalox saddles.

17. The apparatus of claim 10 wherein said first and said second packed towers are physically located within one tower; and wherein said first packed tower is located in the lower portion of said one physical column and said second packed tower is located in the upper portion of said one physical column.

References Cited

UNITED STATES PATENTS 782,021   2/1905   Friberg _____ 210—63

FOREIGN PATENTS 59,260   1/1970   Poland.

MICHAEL ROGERS, Primary Examiner

U.S. Cl. X.R.

210—61, 63, 150, 181